(12) United States Patent
Desrochers

(10) Patent No.: US 10,000,147 B1
(45) Date of Patent: Jun. 19, 2018

(54) RETRACTABLE RECREATIONAL VEHICLE SKIRTING

(71) Applicant: Dayna Rae Desrochers, Irasburg, VT (US)

(72) Inventor: Dayna Rae Desrochers, Irasburg, VT (US)

( * ) Notice: Subject to any disclaimer, the term of this patent is extended or adjusted under 35 U.S.C. 154(b) by 0 days. days.

(21) Appl. No.: 15/646,430

(22) Filed: Jul. 11, 2017

(51) Int. Cl.
*B62D 35/00* (2006.01)
*B60P 3/36* (2006.01)

(52) U.S. Cl.
CPC ..................... *B60P 3/36* (2013.01)

(58) Field of Classification Search
CPC ..... B62D 35/008; B62D 35/00; B62D 35/001
See application file for complete search history.

(56) References Cited

U.S. PATENT DOCUMENTS 2,961,255 A * 11/1960 Trott .................. B60P 3/32
160/23.1

* cited by examiner

*Primary Examiner* — Bryan A Evans
(74) *Attorney, Agent, or Firm* — Dunlap Bennett & Ludwig PLLC

(57) ABSTRACT

A retractable recreational vehicle skirting. The skirting includes brackets configured to secure to a recreational vehicle (RV). The present invention further includes an elongated roller rod having a first end, a second end and a rounded sidewall. The first end and the second end are secured to the brackets so that the elongated roller rod rotates relative to the brackets about a longitudinal axis. The present invention further includes a skirt having an upper edge, a lower edge, a first side edge and a second side edge. The upper edge is coupled to the rounded sidewall of the elongated roller rod.

11 Claims, 3 Drawing Sheets

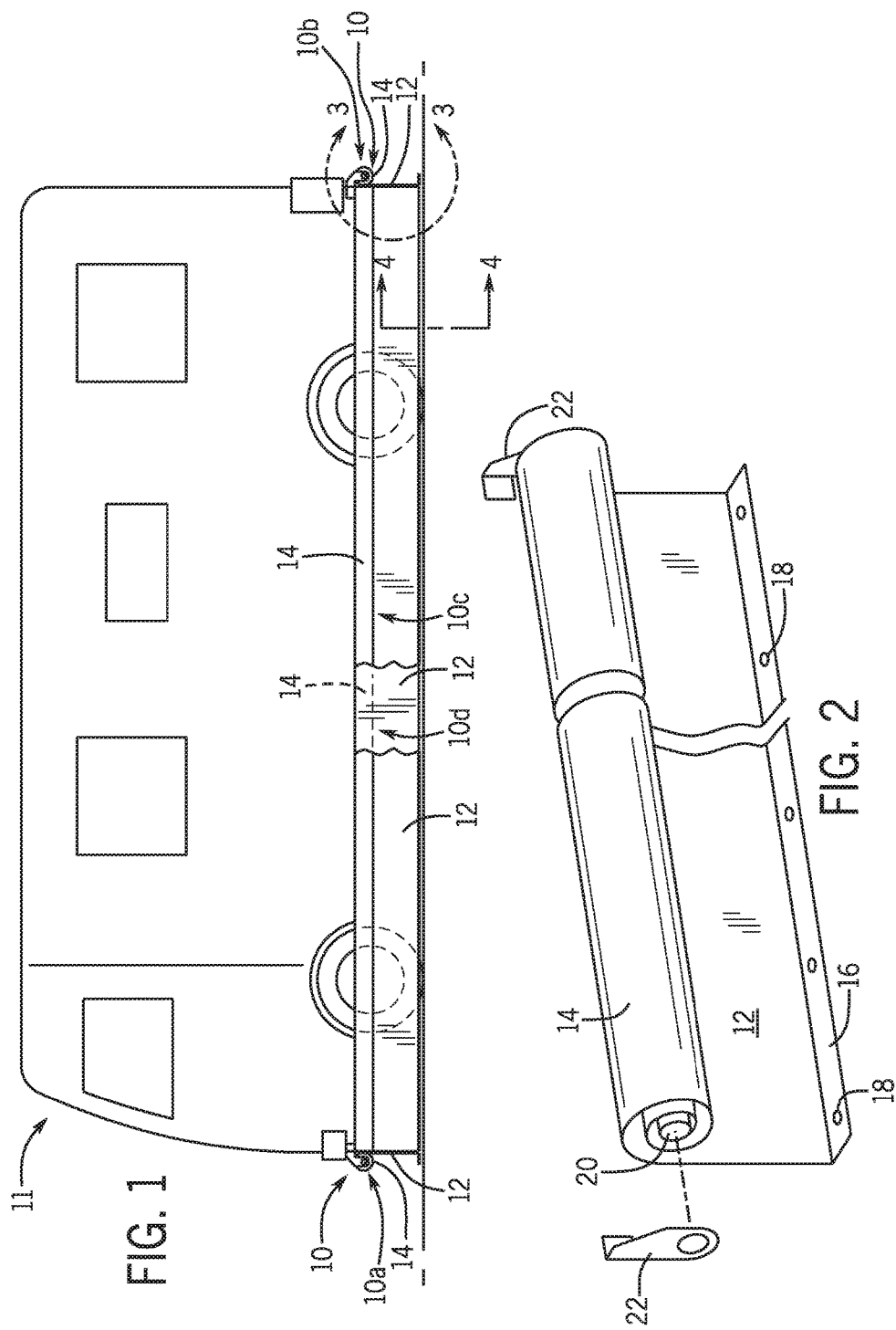

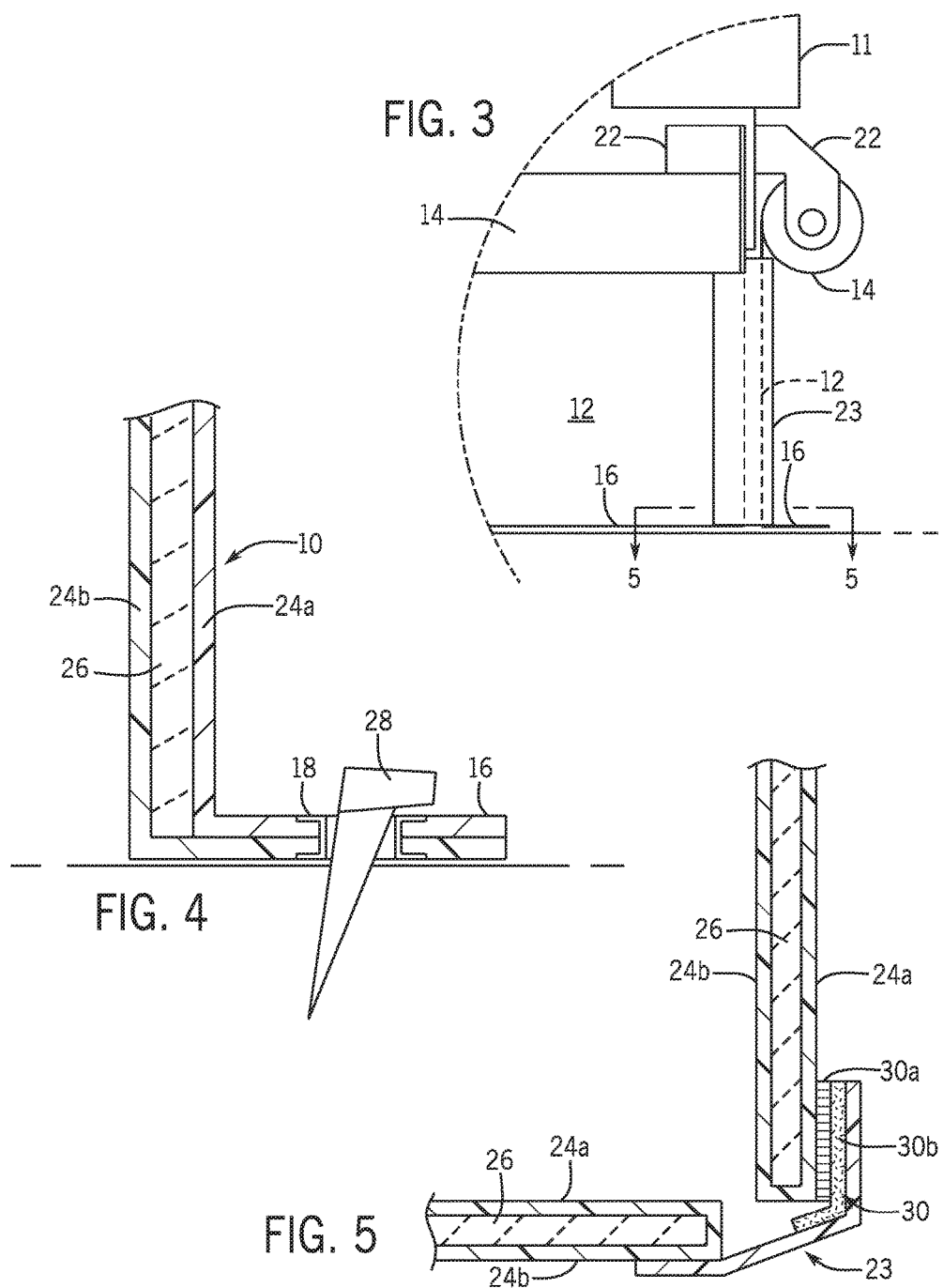

RETRACTABLE RECREATIONAL VEHICLE SKIRTING

BACKGROUND OF THE INVENTION

The present invention relates to skirtings for recreational vehicles and, more particularly, to a retractable and extendable skirting for recreational vehicles.

A skirting may be used to cover the under carriage of a recreational vehicle (RV) when parked. The skirting is used to prevent heat loss and damage to the under carriage. Current skirtings are heavy, difficult and time consuming to install and frequently dislodge.

As can be seen, there is a need for a retractable and extendable skirting that is attached to an RV.

SUMMARY OF THE INVENTION

In one aspect of the present invention, a retractable recreational vehicle skirting comprises: brackets configured to secure to a recreational vehicle; an elongated roller rod comprising a first end, a second end and a rounded sidewall, wherein the first end and the second end are secured to the brackets so that the elongated roller rod rotates relative to the brackets about a longitudinal axis; and a skirt comprising an upper edge, a lower edge, a first side edge and a second side edge, wherein the upper edge is coupled to the rounded sidewall, wherein the skirt comprises a stowed position and a deployed position, the stowed position comprising the skirt substantially rolled around the elongated roller rod and the deployed position comprising a substantial portion of the skirt unrolled from the elongated roller rod.

These and other features, aspects and advantages of the present invention will become better understood with reference to the following drawings, description and claims.

BRIEF DESCRIPTION OF THE DRAWINGS

FIG. 1 is a side elevation view of an embodiment of the present invention in use;

FIG. 2 is a detail perspective view of an embodiment of the present invention;

FIG. 3 is an enlarged detail view indicated by 3-3 of FIG. 1;

FIG. 4 is a detail cross-sectional view taken along line 4-4 in FIG. 1;

FIG. 5 is a detail cross-sectional view taken along line 5-5 in FIG. 3;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an automatic or manual retractable recreational vehicle (RV) skirting. The present invention is used to insulate and protect the under carriage of the RV and surrounding areas. The skirting of the present invention may be permanently and safely secured to the RV for easy and quick use at any point when needed.

The insulated skirting material works to keep the outside elements such as snow, rain and wind out of the undercarriage. The present invention includes a skirt attached to a tube-shaped roller that can maneuver the skirt up and down when necessary. The rolled skirting is affixed to the outside bottom edge of the RV with sturdy metal brackets. The skirts bottom edges are then secured to the ground with stakes. Each individual section of skirts may be attached to one another by connectors. The number of sections and size of the skirting may vary with each style, shape and size of RV.

Figure 6A:
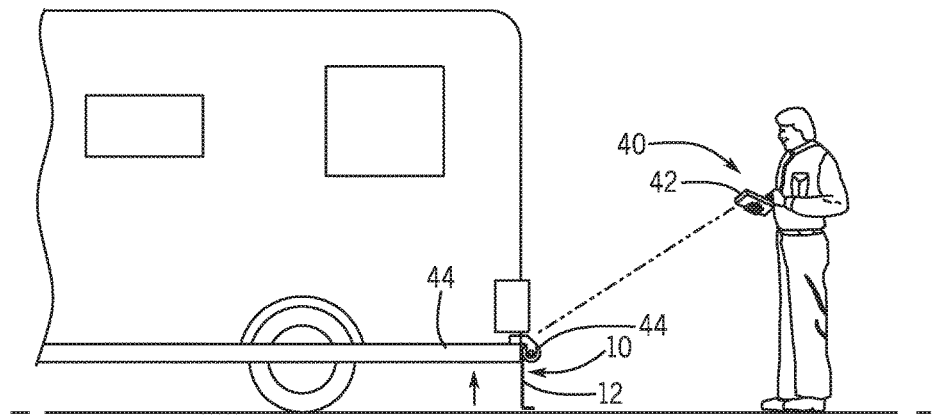
FIG. 6A is a side elevation view of an embodiment of the present invention.
Figure 6B:
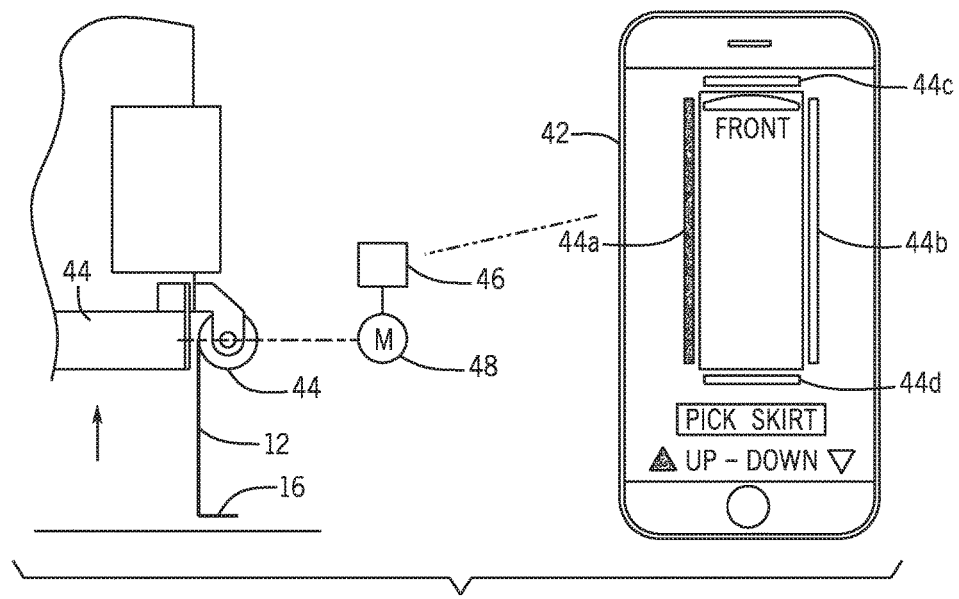
FIG. 6B is a schematic side elevation view of an embodiment of the present invention.

Referring to FIGS. 1 through 6, the present invention includes a retractable recreational vehicle skirting 10. The skirting 10 includes brackets 22 configured to secure to a recreational vehicle (RV) 11. The present invention further includes an elongated roller rod 20 having a first end, a second end and a rounded sidewall. The first end and the second end are secured to the brackets 22 so that the elongated roller rod 20 rotates relative to the brackets 22 about a longitudinal axis. The present invention further includes a skirt 12 having an upper edge, a lower edge, a first side edge and a second side edge. The upper edge is coupled to the rounded sidewall of the elongated roller rod 20.

The elongated roller rod 20 may be attached to the brackets 22 by an interior spring and pin allowing the skirt 12 to raise and lower. The skirt 12 includes a stowed position and a deployed position. The stowed position includes the skirt 12 substantially rolled around the elongated roller rod 20 and the deployed position includes a substantial portion of the skirt 12 unrolled from the elongated roller rod 20 and thereby hanging down from the bottom of the RV 11.

In certain embodiments, the skirt 12 may act as an insulator. In such embodiments, the skirt 12 includes an outer layer 24a, an inner layer 24b and an insulation layer 26 disposed in between the outer layer 24a and the inner layer 24b. The inner and outer layers 24a, 24b may be made of vinyl, loose polymers and the like. The outer layer 24a may include printed colors and designs for decorative purposes.

In certain embodiments, the skirt 12 includes a bend at the lower edge forming a lip 16 substantially perpendicular to a remainder of the skirt 12. The lip 16 may only be formed of the inner and outer layers 24a, 24b sealed together. A plurality of openings may be formed through the lip 16 with a plurality grommets 18 secured to the openings. Each of the grommets 18 are sized to receive a spike 28 therethrough to ensure secure placement of the skirt 12. In the case of the RV 11 is parked on a hard surface such as cement or wood, bricks or cinder blocks may be used to secure the lip 16 to the ground.

The present invention may include a plurality of the retractable recreational vehicle skirtings 10. For example, the present invention includes a front skirting 10a attached to the front end of the RV 11, a rear skirting 10b attached to the rear end of the RV 11, a first side skirting 10c attached to the first side of the RV 11 and a second side skirting 10d attached to the second side of the RV 11. In such embodiments, the front skirting 10a may be releasably attached to the first side skirting 10c and the second side skirting 10d at the first side edge and the second side edge respectively. The rear skirting 10b may be releasably attached to the first side skirting 10c and the second side skirting 10d at the first side edge and the second side edge respectively. The skirtings 10 are releasably attached to one another by fasteners 30. The fasteners 30 may include, but are not limited to hook 30a and loop 30b fasteners, clips, zippers, hooks and grommets, ties and the like. After linking the skirts 12 together, the present invention becomes one solid piece of skirting 10, therefore achieving insulation, extra storage and over all a more aesthetically pleasing appearance.

The skirtings 10 of the present invention may be manual or automatic. Manual skirtings 10 may be pulled down or a crank may be used to lower and raise the skirts 12. An automatic skirting 44 may utilize a motor 48 operably connected to rotate the elongated roller rod 20 and a switch operable to turn the motor 48 on and off. The present invention may further utilize a controller 40 having the switch and a transmitter 42. The controller 40 may further include selections buttons for the right side 44a, left side 44b, front side 44c, and rear side 44d skirtings 44. A receiver 46 is operably connected to the motor 48 and receives signals from the transmitter 42. The controller 40 may be a remote controller. In such embodiments, the transmitter 42 is a wireless transmitter and the receiver 46 is a wireless receiver. The user may press the buttons on the remote controller 42 roll and unroll the skirts 12.

The present invention may be used with an RV as mentioned above, or may be used in home or business construction. For example, the present invention may be attached to decking to create storage for the owner or to keep out weather and reduce heating costs. The present invention may also be used on the exteriors of residential or commercial windows in areas that experience severe weather.

It should be understood, of course, that the foregoing relates to exemplary embodiments of the invention and that modifications may be made without departing from the spirit and scope of the invention as set forth in the following claims.

What is claimed is:

1. A retractable recreational vehicle skirting comprising: brackets configured to secure to a recreational vehicle; an elongated roller rod comprising a first end, a second end and a rounded sidewall, wherein the first end and the second end are secured to the brackets so that the elongated roller rod rotates relative to the brackets about a longitudinal axis; and
a skirt comprising an outer layer, an inner layer, an insulation layer disposed in between the outer layer and the inner layer, an upper edge, a lower edge, a first side edge and a second side edge, wherein the upper edge is coupled to the rounded sidewall, wherein
the skirt comprises a stowed position and a deployed position, the stowed position comprising the skirt substantially rolled around the elongated roller rod and the deployed position comprising a substantial portion of the skirt unrolled from the elongated roller rod.

2. The retractable recreational vehicle skirting of claim 1, wherein the skirt comprises a bend at the lower edge forming a lip substantially perpendicular to a remainder of the skirt.

3. The retractable recreational vehicle skirting of claim 2, further comprising a plurality of grommets secured to the lip, each sized to receive a spike therethrough.

4. A plurality of the retractable recreational vehicle skirting of claim 1, comprising a front skirting, a rear skirting, a first side skirting and a second side skirting.

5. The plurality of the retractable recreational vehicle skirtings of claim 4, wherein the front skirting is releasably attached to the first side skirting and the second side skirting at the first side edge and the second side edge respectively, and the rear skirting is releasably attached to the first side skirting and the second side skirting at the first side edge and the second side edge respectively.

6. The plurality of the retractable recreation vehicle skirtings of claim 5, wherein the skirtings are releasably attached to one another by hook and loop fasteners.

7. The retractable recreational vehicle skirting of claim 1, further comprising a motor operably connected to rotate the elongated roller rod and a switch operable to turn the motor on and off.

8. The retractable recreational vehicle skirting of claim 7, further comprising a controller comprising the switch and a transmitter, wherein the motor comprises a receiver that communicates with the transmitter.

9. The retractable recreational vehicle skirting of claim 8, wherein the controller is a remote controller, the transmitter is a wireless transmitter and the receiver is a wireless receiver.

10. A retractable recreational vehicle skirting comprising: a front skirting, a rear skirting, a first side skirting and a second side skirting each comprising:
brackets configured to secure to a recreational vehicle; an elongated roller rod comprising a first end, a second end and a rounded sidewall, wherein the first end and the second end are secured to the brackets so that the elongated roller rod rotates relative to the brackets about a longitudinal axis; and
a skirt comprising an upper edge, a lower edge, a first side edge and a second side edge, wherein the upper edge is coupled to the rounded sidewall, wherein the skirt comprises a stowed position and a deployed position, the stowed position comprising the skirt substantially rolled around the elongated roller rod and the deployed position comprising a substantial portion of the skirt unrolled from the elongated roller rod, wherein
the front skirting is releasably attached by fasteners to the first side skirting and the second side skirting at the first side edge and the second side edge respectively, and the rear skirting is releasably attached by fasteners to the first side skirting and the second side skirting at the first side edge and the second side edge respectively.

11. A retractable recreational vehicle skirting comprising: brackets configured to secure to a recreational vehicle; an elongated roller rod comprising a first end, a second end and a rounded sidewall, wherein the first end and the second end are secured to the brackets so that the elongated roller rod rotates relative to the brackets about a longitudinal axis;
a skirt comprising an upper edge, a lower edge, a first side edge and a second side edge, wherein the upper edge is coupled to the rounded sidewall; and
a motor operably connected to rotate the elongated roller rod and a switch operable to turn the motor on and off, wherein
the skirt comprises a stowed position and a deployed position, the stowed position comprising the skirt substantially rolled around the elongated roller rod and the deployed position comprising a substantial portion of the skirt unrolled from the elongated roller rod.

* * * * *